UNITED STATES PATENT OFFICE.

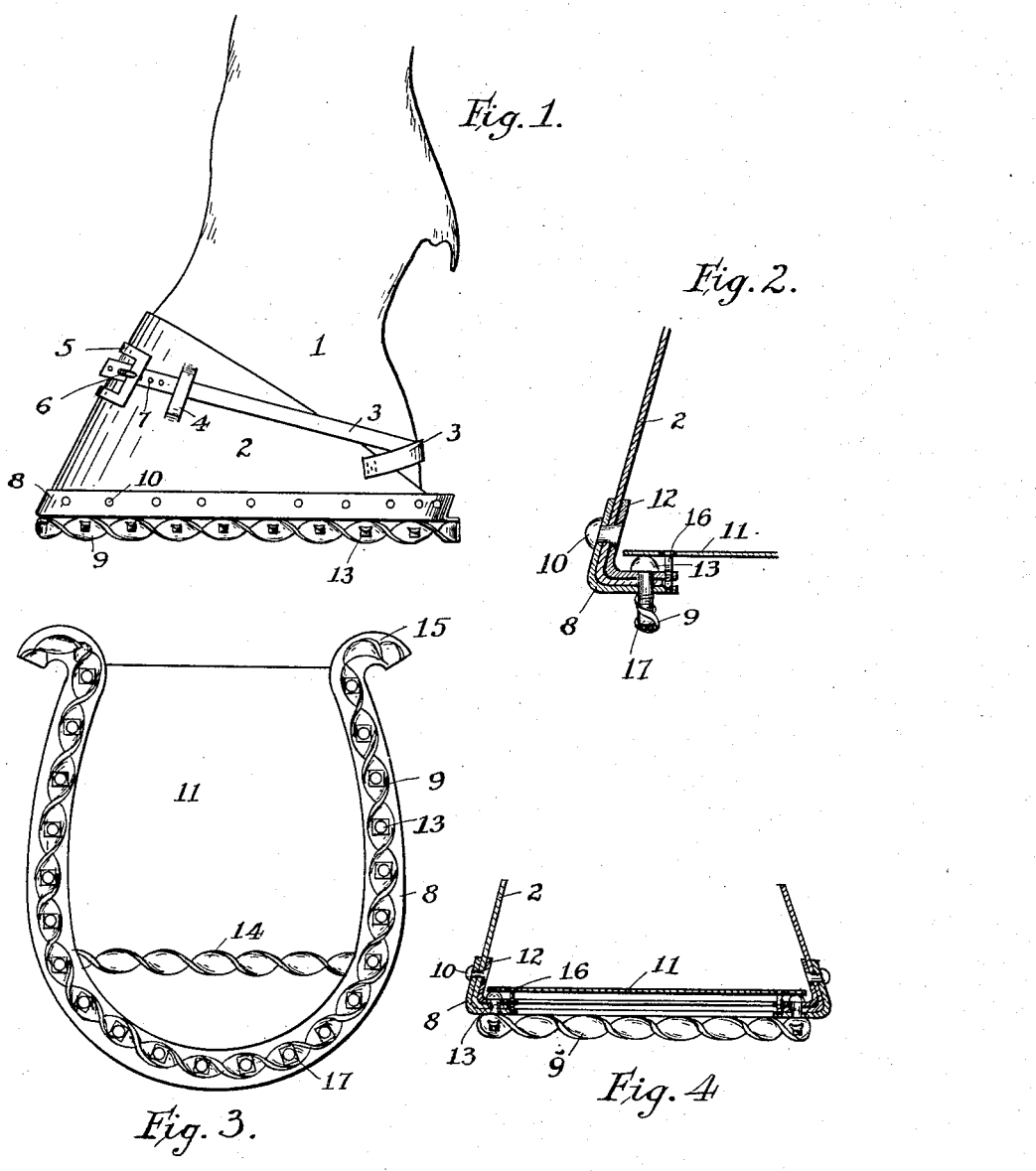

SAMUEL WIESENBERG, OF NEW YORK, N. Y.

HORSESHOE.

1,171,823.     Specification of Letters Patent.     Patented Feb. 15, 1916.

Application filed January 25, 1915. Serial No. 4,085.

*To all whom it may concern:*

Be it known that I, SAMUEL WIESENBERG, a resident of the city of New York, county of Bronx, and State of New York, have invented certain new and useful Improvements in Horseshoes, of which the following is a specification.

This invention relates to anti-slipping horseshoes and especially to those which can readily be attached to and detached from the hoof of a horse.

The object of this invention is the provision of adjustable, easily repairable, non-irritating and efficient anti-slipping means which can be easily put on and quickly secured to the horse's hoof.

To attain this object, I employ the arrangement and combination of parts shown in the preferred form in the accompanying drawings, described in the specification and particularly set forth in the claims.

In the drawings, Figure 1 is a side view of my device showing it attached in proper position to the hoof of a horse. Fig. 2 is an enlarged vertical section on the line A—A of Fig. 1, showing a part of my device. Fig. 3 is a bottom plan view of my invention, showing in particular the means used for preventing slipping and Fig. 4 is a vertical section of the device similar to Fig. 2.

The upper part 2 of the improved shoe, called the upper hereinafter, is made preferably of leather, and is provided with loops 4, said loops being formed by cutting slits of the desired length and distance apart in said upper. (Fig. 1.) For ease in putting on, the upper 2 is cut high at the toe and very low at the heel, and is held to the hoof 1 by means of straps as 3 passed around the heel of the hoof and held in buckle 5 placed near the toe by the usual tongue as 6 engaging the usual holes as 7 in straps 3. To prevent vertical slipping of the straps 3, they are passed through the slits which form loops 4. Said upper 2 supports angle bands 8 and 12 fastened near the bottom on both sides thereof, (Fig. 2), one side of said angles being inclined to fit the hoof, the other flange being horizontal, said angles being curved longitudinally to fit the outline of the hoof bottom.

Rivets as 10 hold the angular bands 8 and 12 on each side of the upper 2, said rivets being preferably flathead on the inside to prevent scraping and irritation of the horse's hoof. Bolts 13 having nuts 17 at the lower ends thereof, hold twisted bar 9, made of steel or other durable metal, to said angle bands 8 and 12. To prevent the hoof of the horse being irritated by the heads of said bolts 13, a metallic plate 11 is suitably held to the horizontal flanges of angle bands 8 and 12 by screws as 16, which allow the easy removal of said plate 11.

By making the gripping member 9 of a single bar of twisted steel rectangular in cross section preferably, a number of sharp edges are provided, said edges being gradually curved and therefore, instead of the usual series of sharp points being driven into and marring the pavement, my device presents the above described series of sharp edges over which the load is distributed and which bite sufficiently on the slippery pavement covering to prevent slipping of the feet of the horse without injury to the pavement. Angle bands 8 and 12 and the attached bar 9 are preferably turned outwardly at their ends, as shown at 15, Fig. 3, in order to provide a large supporting base for the horse. A cross bar 14, similar in construction to bar 9 is suitably attached as described for bar 9, to angle bands 8 and 12, and is used to present a larger number of sharp edges to engage the pavement than would be possible without said cross bar.

When the edges of members 9 and 14 are worn so that they do not properly grip, said members may be readily replaced by removing nuts 17 from bolts 13, removing said members 9 and 14, inserting new ones, by passing the bolts through holes already made in said new members and replacing the nuts. Plate 11 may be removed if necessary by simply loosening screws 16.

The use of metallic angular bands 8 and 12 in connection with the leather upper 2, forms a strong well braced shoe having good wearing properties, and the removable twisted members 9 and 14 are economically made and efficient features of the invention. Adjustability to various sizes of hoofs is accomplished by simply tightening or loosening straps 3 as desired and passing tongue 6 through the proper hole 7 of said strap 3.

It is obvious that my improved shoe is adapted for fastening over the ordinary horseshoe if necessary without diminished efficiency or loss of time in adjustment.

What I claim is:

1. An anti-slipping horse shoe comprising in combination an upper for attachment to the hoof of an animal, a metallic bar twisted to present sharp edges for contact with the ground and shaped to fit the outline of said hoof, and metallic angular bands shaped to fit the outline of said hoof for connecting said upper and said bar.

2. In an anti-slipping horse shoe, the combination of an upper, means for securing said upper to the hoof of an animal, a twisted metallic bar, angular bands secured on each side of said upper at the lower extremity thereof, and bolts for removably securing said bar to said bands.

3. In an anti-slipping horse shoe, a removable gripping member comprising a twisted bar of metal, said bar presenting sharp edges for contact with the ground, metallic angular bands shaped to fit the outline of the hoof for supporting said gripping member, and means for supporting and removably securing said member to said angular bands.

4. In an anti-slipping horse shoe, the combination of an upper cut high at the toe and low at the heel, straps secured to said upper for attaching said shoe to the hoof of an animal, metallic angular bands secured on each side of said upper at the lower extremity thereof, a gripping member of a twisted bar of metal and bolts for removably securing said bar to said bands.

5. In an anti-slipping horse shoe, the combination of means for securing said shoe to the hoof of an animal, a bar of metal twisted to present sharp edges for contact with the ground, means for removably connecting said bar to said securing means, and a metallic plate removably attached to said connecting means.

6. In an anti-slipping horse shoe, the combination of an upper cut high at the toe and low at the heel, straps secured to said upper for adjustably attaching said shoe to the hoof of an animal, a metallic angular band curved to fit the hoof secured to the outside of said upper, a second metallic angular band curved to fit the hoof secured to the inside of said upper, a twisted bar of metal, means for removably securing said twisted bar to said angular bands, a metallic plate and means for removably fastening said plate to said angular bands.

7. In an anti-slipping horse shoe, the combination of means for securing said shoe to the hoof of an animal, metallic angular bands fastened to said securing means, a bar of metal twisted to present a series of sharp edges on the undermost part of said bar, means for removably attaching said bar to said angular bands, a metallic plate and means for removably fastening said plate to said angular bands.

Signed at New York, in the city of New York, this 23rd day of January, 1915, before two subscribing witnesses.

SAMUEL WIESENBERG.

Witnesses:
HARRY JACOBSON,
LUPESCU M. BERNFELD.

Copies of this patent may be obtained for five cents each, by addressing the "Commissioner of Patents, Washington, D. C."